United States Patent
Wu et al.

(10) Patent No.: US 7,810,030 B2
(45) Date of Patent: Oct. 5, 2010

(54) FAULT-TOLERANT ROMANIZED INPUT METHOD FOR NON-ROMAN CHARACTERS

(75) Inventors: Jun Wu, Saratoga, CA (US); Liren Chen, Mountain View, CA (US)

(73) Assignee: Google Inc., Mountain View, CA (US)

( * ) Notice: Subject to any disclaimer, the term of this patent is extended or adjusted under 35 U.S.C. 154(b) by 570 days.

(21) Appl. No.: 11/866,991

(22) Filed: Oct. 3, 2007

(65) Prior Publication Data

US 2008/0028303 A1 Jan. 31, 2008

Related U.S. Application Data

(63) Continuation of application No. 10/928,131, filed on Aug. 25, 2004, now abandoned.

(51) Int. Cl.
*G06F 17/21* (2006.01)
*G06F 17/28* (2006.01)

(52) U.S. Cl. .................. 715/257; 715/221; 715/224; 715/226; 715/255; 715/256; 715/264; 715/265

(58) Field of Classification Search ............. 715/221, 715/224, 226, 255, 256, 257, 264, 265
See application file for complete search history.

(56) References Cited

U.S. PATENT DOCUMENTS

| | | | |
|---|---|---|---|
| 5,572,423 A | 11/1996 | Church | 715/260 |
| 6,131,102 A | 10/2000 | Potter | 715/260 |
| 6,401,060 B1 * | 6/2002 | Critchlow et al. | 704/1 |
| 6,848,080 B1 * | 1/2005 | Lee et al. | 715/203 |
| 7,107,204 B1 * | 9/2006 | Liu et al. | 704/2 |

FOREIGN PATENT DOCUMENTS

WO   WO 01/35250 A2   5/2001

* cited by examiner

*Primary Examiner*—Stephen S Hong
*Assistant Examiner*—Wilson Tsui
(74) *Attorney, Agent, or Firm*—Fish & Richardson P.C.

(57) ABSTRACT

Fault-tolerant systems and methods to process and correct input errors are disclosed. Original inputs can be received, each original input being defined as mapping to multiple characters in a language, each original input having one or more associated proximity measurements. Original inputs that have proximity measurements with one or more non-zero probabilities for respective intended inputs are identified as potentially incorrect original inputs. Each of the potentially incorrect original inputs is expanded to the respective intended inputs, and each of the original inputs and each of the respective intended inputs are converted to characters in the language, each of the conversions being a combination of the converted original inputs and/or the respective intended inputs. Likelihoods of conversions of the original inputs and the respective intended inputs to the characters based in part on the proximity measurements are determined, and most likely conversions are identified for presentation.

10 Claims, 7 Drawing Sheets

| Confusing pairs of Chinese vowels and consonants ||
|---|---|
| in | ing |
| an | ang |
| en | eng |
| l | n |
| sh | s |
| ch | c |
| zh | z |
| h | f |

FIG. 1

| Probabilities of Each Intended Pinyin P' given input Pinyin P |||||||||||||||||||
|---|---|---|---|---|---|---|---|---|---|---|---|---|---|---|---|---|---|---|
| Input P | Intended Pinyin P' ||||||||||||||||||
| | an | ang | cen | ceng | chen | cheng | lei | nei | lin | ling | nin | ning | san | sang | shan | shang | zou | zhou |
| an | 0.95 | 0.05 | | | | | | | | | | | | | | | | |
| ang | 0.08 | 0.92 | | | | | | | | | | | | | | | | |
| cen | | | 0.89 | 0.05 | 0.05 | 0.01 | | | | | | | | | | | | |
| ceng | | | 0.06 | 0.82 | 0.09 | 0.03 | | | | | | | | | | | | |
| chen | | | 0.05 | 0.05 | 0.80 | 0.10 | | | | | | | | | | | | |
| cheng | | | 0.03 | 0.02 | 0.02 | 0.93 | | | | | | | | | | | | |
| lei | | | | | | | 0.91 | 0.09 | | | | | | | | | | |
| nei | | | | | | | 0.10 | 0.90 | | | | | | | | | | |
| lin | | | | | | | | | 0.85 | 0.05 | 0.06 | 0.04 | | | | | | |
| ling | | | | | | | | | 0.03 | 0.93 | 0.02 | 0.02 | | | | | | |
| nin | | | | | | | | | 0.04 | 0.01 | 0.91 | 0.04 | | | | | | |
| ning | | | | | | | | | 0.06 | 0.06 | 0.01 | 0.77 | | | | | | |
| san | | | | | | | | | | | | | 0.94 | 0.01 | 0.02 | 0.03 | | |
| sang | | | | | | | | | | | | | 0.05 | 0.85 | 0.05 | 0.05 | | |
| shan | | | | | | | | | | | | | 0.04 | 0.04 | 0.87 | 0.05 | | |
| shang | | | | | | | | | | | | | 0.01 | 0.02 | 0.03 | 0.94 | | |
| zou | | | | | | | | | | | | | | | | | 0.92 | 0.08 |
| zhou | | | | | | | | | | | | | | | | | 0.07 | 0.93 |

FIG. 2

| Fuzzy Pinyins Corresponding to a Confusing Pinyin Input |||||
|---|---|---|---|---|
| Pinyin Input | zhong | guo | zhen | fu |
| Fuzzy Pinyin(s) (incl. orig. i/p) | zhong, zong | guo | zhen, zheng, zen, zeng | fu, hu |

FIG. 4

| Conversions to Characters or Words From Fuzzy Pinyins ||||
|---|---|---|---|
| middle (zhong) loyalty (zhong) clock (zhong) family name (zong) | country (guo) city (guo) | oscillation(zhen) vibration (zhen) needle (zhen) real (zhen) township (zhen) politics (zheng) earning (zheng) how (zen) family name (zeng) increase (zeng) donate (zeng) | amplitude (fu) home (fu) luck (fu) husband (fu) family name (hu) lake (hu) tiger (hu) |
| | really (guo zhen) |||
| China/Chinese (zhong guo) palm fruit (zong guo) | government (zheng fu) positive/negative (zheng fu) conquer (zheng fu) increase (zeng fu) |||

FIG. 5

Query: zhong guo zhen fu

您是不是要找: 中国振幅 中国振富 中国政府
                                       30       32       34

您是不是要找: 中国振幅 中国振富 中国政(zheng)府
                                                                         36

FIG. 7

FAULT-TOLERANT ROMANIZED INPUT METHOD FOR NON-ROMAN CHARACTERS

The application is a continuation of U.S. patent application Ser. No. 10/928,131, filed on Aug. 25, 2004, the entire disclosure of which is incorporated herein by reference.

BACKGROUND OF THE INVENTION

1. Field of the Invention

The present invention relates generally to processing non-Roman based languages. More specifically, fault-tolerant systems and methods to process and correct input spelling errors for non-Roman based languages such as Chinese, Japanese, and Korean (CJK) are disclosed.

2. Description of Related Art

Spell correction generally includes detecting erroneous words and determining appropriate replacements for the erroneous words. Most spelling errors in alphabetical, i.e., Roman-based, languages such as English are either out of vocabulary words, e.g., "thna" rather than "than," or valid words improperly used in its context, e.g., "stranger then" rather than "stranger than." Spell checkers that detect and correct out of vocabulary spelling errors in Roman-based languages are well known.

Users of non-Roman based languages such as Chinese, Japanese, and Korean (CJK) often utilize Roman-based (alphabetical) input methods. For example, many Chinese language users use pinyin (phonetic spelling) to input Chinese characters. However, Chinese language users may not know the correct pronunciations (pinyins) of some Chinese characters due to, for example, their dialect and/or accent, and therefore may enter incorrect pinyin inputs.

The conventional pinyin input system typically converts a pinyin input and provides a list of candidate Chinese character sets from which the user may select the intended set of Chinese characters. However, the user's intended character set may not be included in the candidate list as most pinyin input methods have a low or no fault tolerance.

In addition, non-Roman based languages such as Chinese, Japanese, and Korean (CJK) languages generally have no invalid characters encoded in any computer character set, e.g., UTF-8 character set, such that most spelling errors are valid characters improperly used in context rather than out of vocabulary spelling errors. In Chinese, the correct use of words can generally only be determined in context. Thus an effective spell checker for a non-Roman based language should make use of contextual information to determine which characters and/or words in context are not suitable.

Spell correction for non-Roman languages such as CJK languages is also complex and challenging in that there are no standard dictionaries in such languages because the definition of CJK words are not clean. For example, some may regard "Beijing city" in Chinese as one word while others may regard them as two words. In contrast, the English dictionary/wordlist lookup is a key feature in English spell correction and thus English spell correction methods cannot be easily adapted for use in CJK languages. Furthermore, the Chinese language has a high concentration of homographs and homophones as well as invisible (or hidden) word boundaries that create ambiguities that also make efficient and effective Chinese spell correction complex and difficult to implement. As is evident with such differences between Chinese and English, many efficient techniques available for English spell correction are not suitable for Chinese spell correction.

Thus what is needed is a computer system and method for effective, efficient and accurate processing and correcting of spelling errors for non-Roman based languages such as Chinese, Japanese and Korean languages.

SUMMARY OF THE INVENTION

Fault-tolerant systems and methods to process and correct input spelling errors for non-Roman based languages such as Chinese, Japanese, and Korean (CJK) are disclosed. In particular, the systems and methods use the hidden Markov model and a proximity matrix of pinyins with confusing pronunciations. In the fault-tolerant pinyin input method, the proximity between a pair of confusingly similar pinyins may be a positive number if they are pronounced similarly. Otherwise, the value is zero. In one embodiment, the proximity may be a probability or likelihood with a value between 0 and 1. The systems and methods are particularly applicable to web-based search engines and downloadable applications at client sites, e.g., implemented in a toolbar or deskbar, but are applicable to various other applications. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. The term computer generally refers to any device with computing power such as personal digital assistants (PDAs), cellular telephones, and network switches. Several inventive embodiments of the present invention are described below.

The fault-tolerant input method generally includes receiving an input in a format representing characters in a language, the input having at least one original component, identifying potentially incorrect input components, expanding each potentially incorrect component to at least one additional alternative component, each pair of potentially incorrect component and corresponding alternative component having a proximity measurement, converting each input component and each alternative component to the language, computing probabilities of possible conversions of the input to characters in the language, each possible conversion being a combination of the converted original and/or alternative components of the input, the probabilities being based on the proximity measurement and optionally on a context of the possible conversion, and determining a most likely conversion from the possible conversions.

As an example, the method may be applied to a Chinese input method using pinyin. For example, the method may include receiving a pinyin input having at least one original pinyin representing Chinese characters, identifying potentially incorrect pinyins, expanding each potentially incorrect pinyin to at least one additional alternative pinyin, each pair of potentially incorrect and corresponding alternative pinyin having a proximity measurement, converting the pinyins in the input and the alternative pinyins to Chinese characters, computing probabilities of possible conversions of the pinyin input to Chinese characters, each possible Chinese conversion being a combination of the converted original and/or alternative pinyins of the input, the probabilities being based on the proximity measurement and optionally on a context of the possible Chinese conversion, and determining a most likely Chinese conversion from the possible conversions.

The identifying potentially incorrect input components may be based on pairs of confusingly similar components which in turn may be based on confusing pairs of vowels and consonants. Each potentially incorrect component may be associated with at least one confusingly similar alternative such that the expanding includes expanding each potentially incorrect component to every additional alternative component associated therewith. The converting may be performed on each component individually and/or on multiple components jointly. The determining of the most likely conversion may include determining multiple most likely conversions. For example, the most likely conversions may include at least one possible original conversion converted from only the original components of the input. The most likely conversions may also include a possible modified conversion that includes at least one converted alternative component, for example, if the probability of the possible modified conversion exceeds the probability of the possible original conversion by a predetermined threshold.

The language may be a non-Roman based language such a Chinese, Japanese, Korean (CJK) or That, etc. In the case that the language is Chinese and more typically simplified Chinese, the format may be pinyin. The method can be utilized in various applications such as in a search engine such that the input is a user search query. Various other systems may similarly employ such fault-tolerant input methods such as language input systems.

A fault-tolerant input system generally includes a receiver adapted to receive an input having at least one original component in a format representing characters in a language, an identifier adapted to identify potentially incorrect components of the received input, an expander adapted to expand each potentially incorrect component of the received input to at least one additional alternative component in the format, each pair of the potentially incorrect component of the input and the corresponding additional alternative component having a proximity measurement, a converter adapted to convert each component of the received input and each additional alternative component in the format to the language, a computing module adapted to compute probabilities of possible conversions of the received input to characters in the language, each possible conversion being a combination of the converted original and/or alternative components of the received input, the probabilities being based at least in part on the proximity measurement, and an output module adapted to determine a most likely conversion to characters in the language from the possible conversions of the input.

A computer program product for use in conjunction with a computer system, the computer program product generally includes a computer readable storage medium on which are stored instructions executable on a computer processor, the instructions including receiving an input in a format representing characters in a language, the input having at least one original component, identifying potentially incorrect input components, expanding each potentially incorrect input component to at least one additional alternative component, each pair of potentially incorrect component and the corresponding alternative component having a proximity measurement, converting each input component and each alternative component in the format to the language, computing probabilities of possible conversions of the input to characters in the language, each possible conversion being a combination of the converted original and/or alternative components of the input, the probabilities being based at least in part on the proximity measurement, and determining a most likely conversion to characters in the language from the possible conversions of the input.

A method for generating proximity measurements may generally include collecting user inputs in a format representing characters in a language and rates of user selection of corresponding candidates decoded from the user inputs into the language, identifying user inputs having a low rate of candidate selection as non-selected inputs, determining a percentage of each non-selected input entered without a user selection of any of the decoded candidates being made, assigning a modified input close in confusion proximity to each corresponding non-selected input as a corresponding intended input, the modified input having a higher rate of candidate selection than the corresponding non-selected input, determining the proximity measurement for each pair of modified input and non-selected input based on the number of times the corresponding non-selected input is entered as input and the number of times the corresponding non-selected input is entered as input without a user selection of any of the decoded candidates being made. The confusion proximity may be based on a list of pairs of confusingly similar elements in the format and the modified input differs from the corresponding non-selected input by one or more pairs of the confusingly similar elements.

An application implementing the system and method may be implemented on a server site such as on a search engine or may be implemented, e.g., downloaded, on a client site such as a user's computer to provide spell corrections for text inputting into a document or to interface with a remote server such as a search engine.

These and other features and advantages of the present invention will be presented in more detail in the following detailed description and the accompanying figures which illustrate by way of example principles of the invention.

BRIEF DESCRIPTION OF THE DRAWINGS

The present invention will be readily understood by the following detailed description in conjunction with the accompanying drawings, wherein like reference numerals designate like structural elements.

FIG. 1 is a table listing an exemplary set of common confusing pronunciations pairs of Chinese vowels and consonants.

FIG. 2 is a proximity matrix of confusing pinyins containing the probabilities of various intended pinyins given a potentially incorrect (confusing) input pinyin.

FIG. 4 is a table listing confusing pinyins generated from an exemplary pinyin input "zhong guo zhen fu" based on the list of common confusing pronunciations pairs of Chinese vowels and consonants of FIG. 1.

FIG. 5 is a table listing conversions to Chinese characters or words generated from the list of confusing pinyins in FIG. 4 for the exemplary pinyin input "zhong guo zhen fu."

FIG. 7 is two illustrative user interfaces each presenting a candidate list of three most likely candidate conversions from the exemplary pinyin input "zhong guo zhen fu" of FIGS. 4-6, including one candidate conversion corresponding to a spelling-corrected pinyin input.

DESCRIPTION OF SPECIFIC EMBODIMENTS

Figure 3:
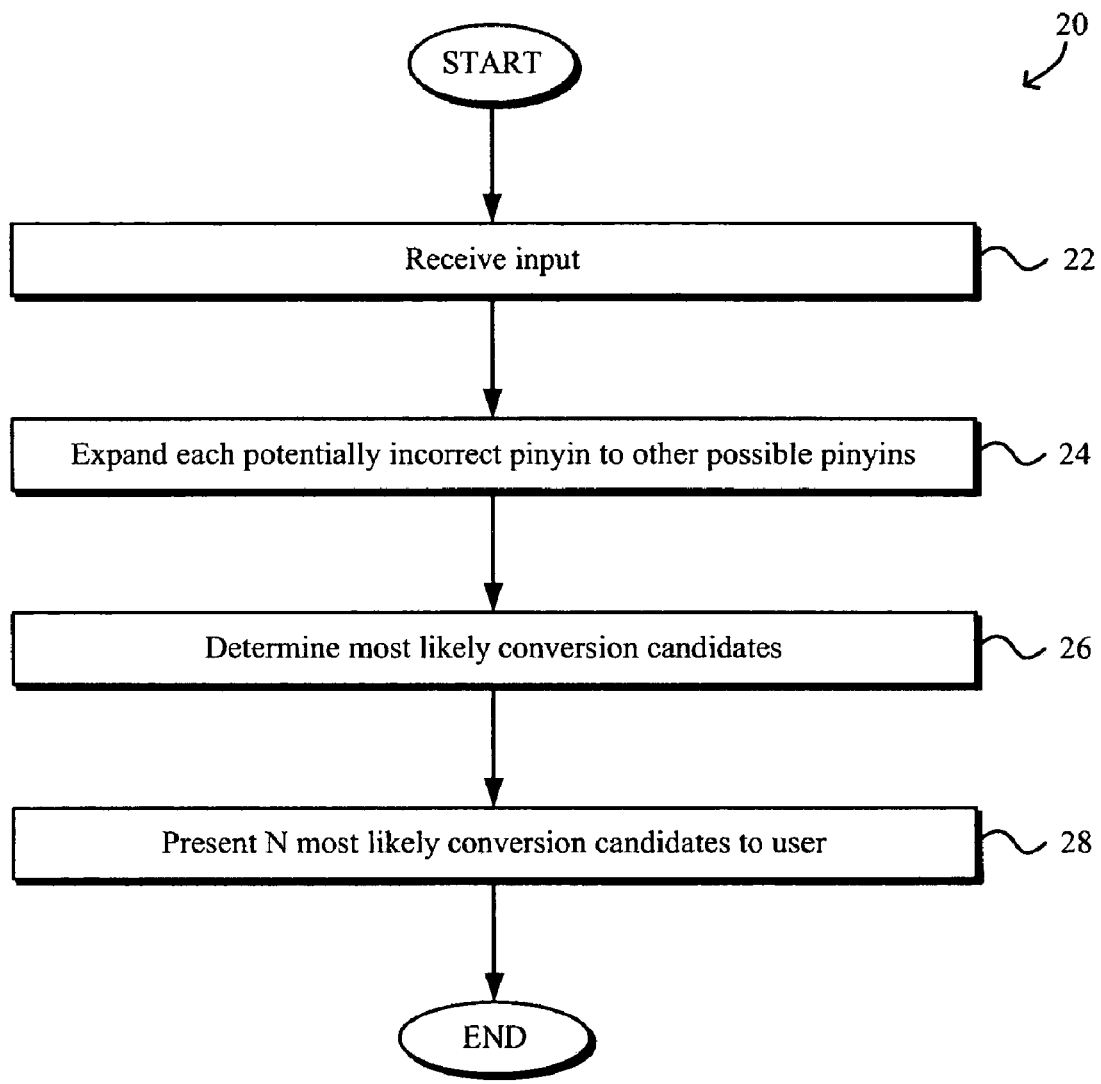
FIG. 3 is a flowchart illustrating a process for automatically converting a confusing input pinyin to a set of candidates that may include one or more candidates corresponding to a spelling-corrected pinyin input.

Fault-tolerant systems and methods to process and correct input spelling errors for non-Roman based languages such as Chinese, Japanese, and Korean (CJK) are disclosed. The fault-tolerant input systems and methods described herein generally relate to processing, detecting, and correcting spelling errors by employing probabilities that may be derived from user input entries and associated user selections such as query logs. It is noted that for purposes of clarity only, the examples presented herein are generally presented in terms of processing, detecting and correcting Chinese pinyin inputs. However, the systems and methods for spelling error detection and correction may be similarly applicable for other non-Roman based languages such as Japanese, Korean, Thai, etc. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Users of non-Roman based languages such as Chinese, Japanese, and Korean (CJK) often utilize Roman-based (alphabetical) input methods. For example, many Chinese language users use pinyin (phonetic spelling) for inputting Chinese characters such as a search query for a search engine. Pinyin is a phonetic input method used mainly for inputting simplified Chinese character. As referred to herein, pinyin generally refers to phonetic representation of Chinese characters, with or without representation of the tones associated with the Chinese characters. In particular, "pinyin" as used herein refers to all phonetic notations for Chinese, simplified or traditional, include zhuyin fuhao (Bopomofo), i.e., "The Notation of Annotated Sounds."

Some Chinese language users may not know the correct pronunciations (pinyins) of some Chinese characters due to, for example, their dialect and/or accent, and therefore may enter incorrect pinyin inputs. However, despite an incorrect pinyin input, the fault-tolerant pinyin input processing system converts the incorrect pinyin input and aims to provide a list of candidate Chinese character sets that includes the user's intended Chinese character set.

Most often, pinyin spelling errors attributable to incorrect pronunciations are based on a set of confusing pronunciation pairs of vowels and consonants. In other words, a large portion of pinyin spelling errors attributable to incorrect pronunciations may result from the user interchanging one for the other of a confusing pair of vowels or consonants. The table of FIG. 1 lists an exemplary set of common confusing pairs of pronunciations of Chinese vowels and consonants. Pronunciations of the confusing consonants and/or vowels listed in FIG. 1 can be similar and confusing to many Chinese language users such that pinyin inputs that contain one or more of the confusing consonants and/or vowels may be misspelled. It is to be understood that additional and/or alternative confusing consonants and/or vowels may exist and may be taken into account by the fault-tolerant input system and method as described herein and that FIG. 1 is merely an exemplary set that may be employed in the systems and methods described herein. As shown, common confusing consonant pairs may include retroflexion and non-retroflexion, such as sh/s, ch/c, and the like, as well as various other confusing consonant pairs such as h/f, l/n, and the like. Common confusing vowels may include front and back nasal sound such as an/ang, en/eng, in/ing, and the like.

To identify and correct pinyin input errors, a probability of an intended pinyin given an input pinyin may be utilized to facilitate in determining whether the input pinyin is likely to be incorrect and if so, the most likely corrected or intended pinyin and/or the most likely pinyin-to-character/word conversions based on the corrected or intended pinyin. A collection of probabilities of an intended pinyin P' given an input pinyin P, i.e., p(P'|P), may be provided in a proximity matrix, also referred to herein as fuzzy pinyin matrix. FIG. 2 is an example of a normalized proximity or fuzzy pinyin matrix of confusing pinyin pairs. A confusing pinyin, as referred to herein, generally refers to a pinyin containing at least one of the identified common confusing consonant or vowel pairs such as those listed in FIG. 1. In other words, a confusing pinyin is one that may be mispronounced and thus misspelled according to the set of common confusing pairs of pronunciations such as that shown in FIG. 1. All other pinyins are non-confusing pinyins, i.e., pinyins that do not contain any of the identified common confusing consonant or vowel pairs such as those listed in FIG. 1.

Referring again to FIG. 2, each cell of the proximity matrix indicates how likely when a user intended pinyin P' when the user entered pinyin P. The matrix contains the probabilities of various possible intended pinyins P' given a confusing input pinyin P. The empty cells represent a value of 0, i.e., no confusion or ambiguity between the corresponding pinyin pair. To illustrate, given an input pinyin P "lin," the user's intended pinyin P' may be "lin" (the original input pinyin, i.e., P'=P), "ling" (in-ing confusing pair from FIG. 1), "nin" (l-n confusing pair), or "ning" (both l-n and in-ing confusing pairs). Each of the possible intended pinyins P' corresponds to an estimated or otherwise computed probability that the user intended pinyin P' given the input pinyin P.

The proximity matrix may be built based on some knowledge or assumptions of Chinese pronunciations and optionally on statistics specifying the frequency of the mistakes that Chinese language users make. Such knowledge and/or statistics may be obtained from, for example, search query logs. For purposes of reducing computational complexity only, once the fuzzy pinyin matrix is established, misspellings can be assumed to be context independent although such an assumption may not be true.

The matrix of FIG. 2 is a small subset of all possible confusing pinyin pairs and only illustrates some of the likelihoods or probabilities that may be computed or otherwise assigned to the corresponding confusing pinyin pairs and different likelihoods or probabilities may be similarly computed or otherwise assigned. In particular, assuming that the table of FIG. 1 lists all confusing pairs of Chinese vowels and consonants, roughly half of the approximately 408 Chinese pinyins can be confused with another confusing Chinese pinyin. The estimated probability of an intended pinyin P' being entered as pinyin P may be used to determine if the input pinyin is likely to be misspelled and if so, the most likely correct or intended pinyin or candidate characters. Contextual probabilities may also be used in determining a set of likely candidate Chinese characters to increase the accuracy of such determinations. The estimated probability can be used to determine the probability of the corresponding Chinese characters. Thus the more likely a given pinyin (original input or alternate) is the intended pinyin, the higher the probability of the corresponding Chinese characters. Merely as example, if each of the intended pinyins "san" and "shan" has a likelihood of approximately 1% and 3%, respectively, of being mispronounced and misspelled as "shang," the Chinese characters corresponding to the pinyin "san" would be assigned a weight that is one-third that for the Chinese characters corresponding to "shan." Thus the perplexity stays nearly the same as that of not considering the confusing pinyins. Perplexity generally relates to the average number of possible characters given the context. The greater the perplexity, the more uncertain the character can be.

FIG. 3 is a flowchart illustrating a process 20 for automatically converting a pinyin input that may include one or more confusing pinyins to candidate Chinese character sets that may include one or more Chinese character sets corresponding to a spelling-corrected pinyin input. At block 22, a user pinyin input is received. At block 24, each confusing pinyin, if any, in the pinyin input is identified and expanded to include the other possible intended pinyins. At block 26, the most likely conversion candidates are determined. In performing blocks 24 and 26, a fuzzy pinyin proximity matrix, such as one shown in FIG. 2, may be employed to identify possible intended pinyins for a given confusing pinyin and their corresponding probabilities. In addition, in determining the most likely conversion candidates at block 26, contextual probabilities may also be employed. At block 28, N (e.g., 3) most likely conversion candidates are presented to the user.

Various suitable mechanisms for converting each fuzzy pinyin to corresponding Chinese characters and/or words such as performed in block 26 may be implemented. For example, various decoders are suitable for converting pinyin to Hanzi (Chinese characters). In one embodiment, a Viterbi decoder using hidden Markov models may be implemented. The training for the hidden Markov models may be achieved, for example, by collecting empirical counts or by computing an expectation and performing an iterative maximization process. The Viterbi algorithm is a useful and efficient algorithm to decode the source input according to the output observations of a Markov communication channel. The Viterbi algorithm has been successfully implemented in various applications for natural language processing, such as speech recognition, optical character recognition, machine translation, speech tagging, parsing and spell checking. However, it is to be understood that instead of the Markov assumption, various other suitable assumptions may be made in implementing the decoding algorithm. In addition, the Viterbi algorithm is merely one suitable decoding algorithm that may be implemented and various other suitable decoding algorithms such as a finite state machine, a Bayesian network, a decision plane algorithm (a high dimension Viterbi algorithm) or a Bahl-Cocke-Jelinek-Raviv (BCJR) algorithm (a two pass forward/backward Viterbi algorithm) may be implemented.

Figure 6:
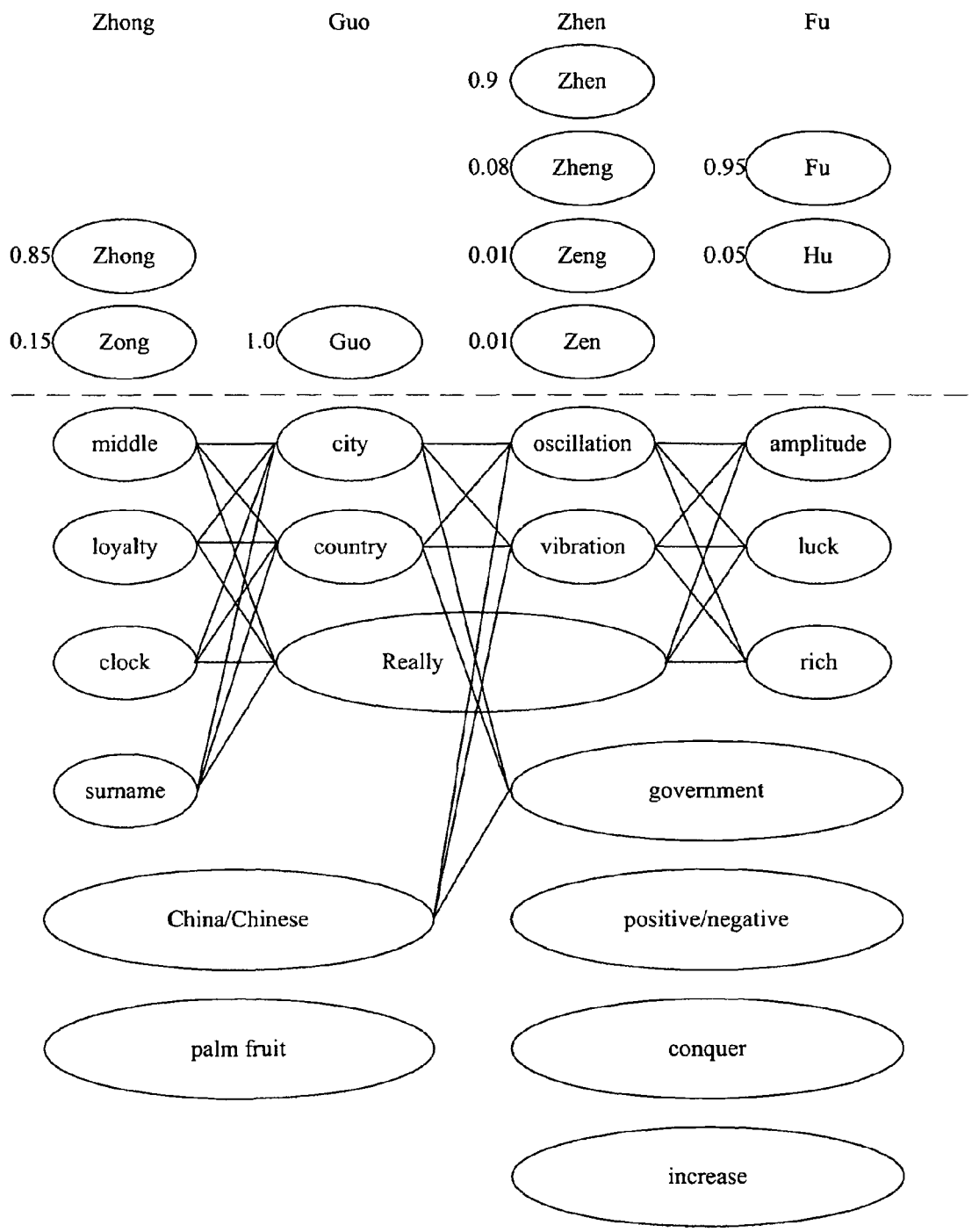
FIG. 6 is a lattice diagram illustrating the confusing pinyins, some of their conversions to Chinese characters and words, and the transitions between each pair of the Chinese character/word conversions for the exemplary pinyin input "zhong guo zhen fu" of FIGS. 4 and 5.

FIGS. 4-6 illustrate an example of the process 20 for automatically converting an exemplary confusing pinyin input "zhong guo zhen fu" to candidate Chinese character sets that may include one or more Chinese character sets corresponding to a spelling-corrected pinyin input. Specifically, FIG. 4 is a table expanding each pinyin in the confusing pinyin input "zhong guo zhen fu" to its corresponding confusing or fuzzy pinyins (i.e., the original pinyin and any other confusing pinyins) based on the list of common confusing pronunciations pairs of Chinese vowels and consonants. For example, a lookup of the proximity matrix such as that shown in FIG. 2 may be performed in order to expand each pinyin in the confusing pinyin input to its corresponding confusing or fuzzy pinyins. As shown, each of "zhong," "zhen," and "fu" is expanded to multiple confusing pinyins. In contrast, "guo" corresponds only to itself as it is generally not confused with any other pinyin, i.e., no ambiguity.

FIG. 5 is a table listing illustrating some of the possible conversions to Chinese characters or words generated from the list of expanded fuzzy or confusing pinyins of FIG. 4 for the exemplary pinyin input "zhong guo zhen fu." As shown, in the absence of context, each Chinese pinyin can map to multiple Chinese characters. For example, the pinyin "fu" can be mapped to amplitude, home, luck, husband, etc. while the pinyin "hu" maps to family name, lake, tiger, etc. In addition, where two or more pinyins can form a Chinese word, the multiple pinyins can also be converted to the Chinese word. For example, the pinyins "zhong guo" may be converted to Chinese or China.

FIG. 6 is a lattice diagram illustrating the confusing/fuzzy pinyins, some of their conversions to Chinese characters or words, and the transitions between each pair of the Chinese character/word conversions for the exemplary pinyin input "zhong guo zhen fu" of FIGS. 4 and 5. As shown, each fuzzy pinyin node is associated with a probability $p(P'|P)$ of the fuzzy pinyin being the intended pinyin $P'$ given the input pinyin $P$. For example, the probabilities $p(zong|zhong)$ and $p(zhong|zhong)$ of the fuzzy pinyins "zong" and "zhong" being the intended pinyin given the input pinyin "zhong" is 0.15 and 0.85, respectively. Note that because the input pinyin "guo" corresponds only to itself, its assigned probability is 1.0.

FIG. 6 also illustrates some of the conversions of the fuzzy pinyins to Chinese characters or words as well as some of the transitions between each possible pair of the Chinese character/word conversions. Merely for purposes of clarity, not all of the conversions of the fuzzy pinyins to Chinese characters or words are shown and not all of the transitions of the conversions are shown. A probability for each link or transition may be assigned based on context, for example. Thus the probability or likelihood of each possible path, i.e., from the conversion of the first to the last pinyin, may be determined. In one embodiment, the probability score for a given path may be determined by multiplying the probability of each node in the path as well as the probability of each link in the path.

FIG. 7 shows two illustrative user interfaces each presenting a candidate list of N (e.g., 3) likely conversion candidates from the exemplary pinyin input "zhong guo zhen fu" of FIGS. 4-6. Note that various other suitable user interfaces may be utilized. The likely N conversion candidates presented to the user may be selected from both candidates generated from the original input and candidates, if any, generated using the fault-tolerant methods. A decision as to whether to present the spelling-corrected conversion candidate may be based on, for example, whether the probability score of the spelling-corrected candidate exceeds that of the most and/or the second most likely original input candidate by a minimum predetermined threshold. As shown, the two most likely candidate conversions 30, 32 are converted from the original pinyin input "zhong guo zhen fu" while the third candidate conversion 34 is converted from a spelling-corrected pinyin input of "zhong guo zheng fu." In particular, the candidate conversion 30 corresponds to the China/Chinese—oscillation—amplitude path while the candidate conversion 30 corresponds to the China/Chinese—vibration—rich path in the lattice shown in FIG. 6. The spelling-corrected candidate conversion 34 corresponds to the Chinese-government path in the lattice shown in FIG. 6.

The spelling-corrected or fuzzy conversion candidate 34 may be presented differently from the original pinyin conversion candidates 30, 32 so as to indicate to and alert the user that the fuzzy conversion 34 corresponds to a spelling-corrected pinyin input rather than the original pinyin input. Merely as examples, the corrected candidate conversion 34 may be presented in a different color and/or a different font (font size, underlined, bold, and/or italicized, etc.).

Figure 8:
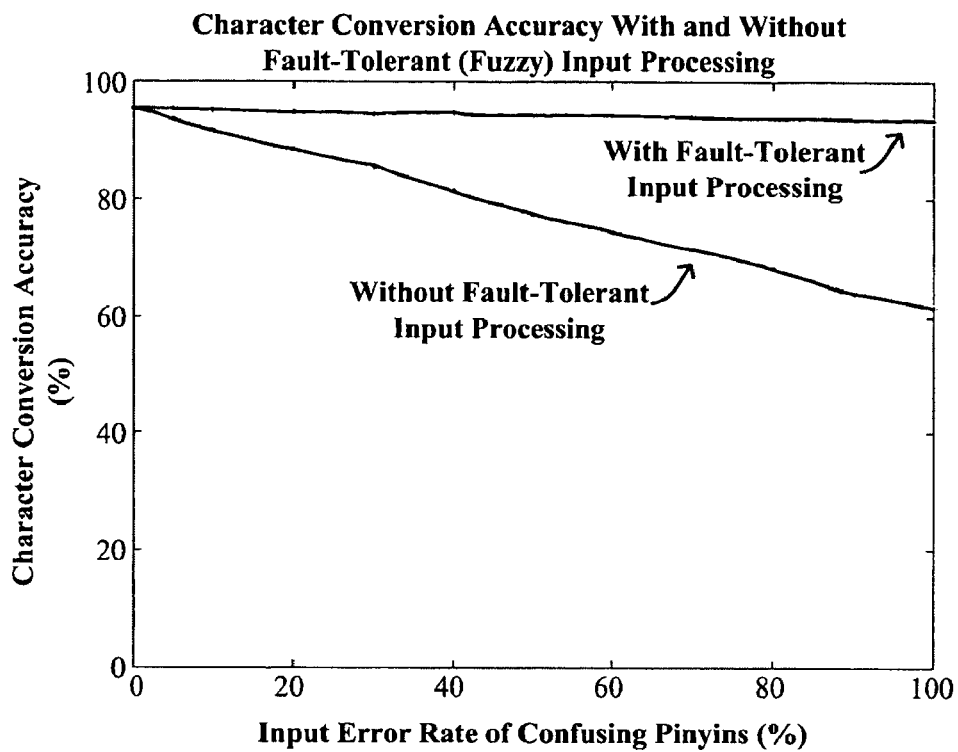
FIG. 8 is a graph illustrating character conversion accuracy rate relative to confusing pinyin input error rate with and without fault-tolerant input processing.

FIG. 8 is a graph illustrating character conversion accuracy rate relative to a confusing pinyin input error rate with (upper curve) and without (lower curve) fault-tolerant input processing. The confusing pinyin input error rate (x-axis) refers to the percentage of confusing pinyins that are incorrectly entered. The graph of FIG. 8 may be generated from, for example, a set of user inputs such as user queries. As shown, the conversion accuracy with 0% confusing pinyin input error rate can be as high as approximately 96%. However, if any of the pinyins in the character input is incorrect, i.e., confused with another similarly pronounced pinyin, the character conversion accuracy decreases. The lower curve illustrates a relatively significant decrease in character conversion accuracy without the use of the fault-tolerant (fuzzy) pinyin input processing as the confusing pinyin input error rate increases. For example, the character conversion accuracy decreases to approximately 62% at a 100% confusing pinyin input error rate. Note that even if all the confusing pinyins in an input are incorrect, the input may contain non-confusing pinyins such that the conversion accuracy is not 0% even at a 100% confusing pinyin input error rate. The upper curve illustrates a much lower decrease in character conversion accuracy with the use of fault-tolerant (fuzzy) pinyin input processing even as the confusing pinyin input error rate increases. For example, the character conversion accuracy remains relatively unchanged even at 100% confusing pinyin input error rate.

Figure 9:
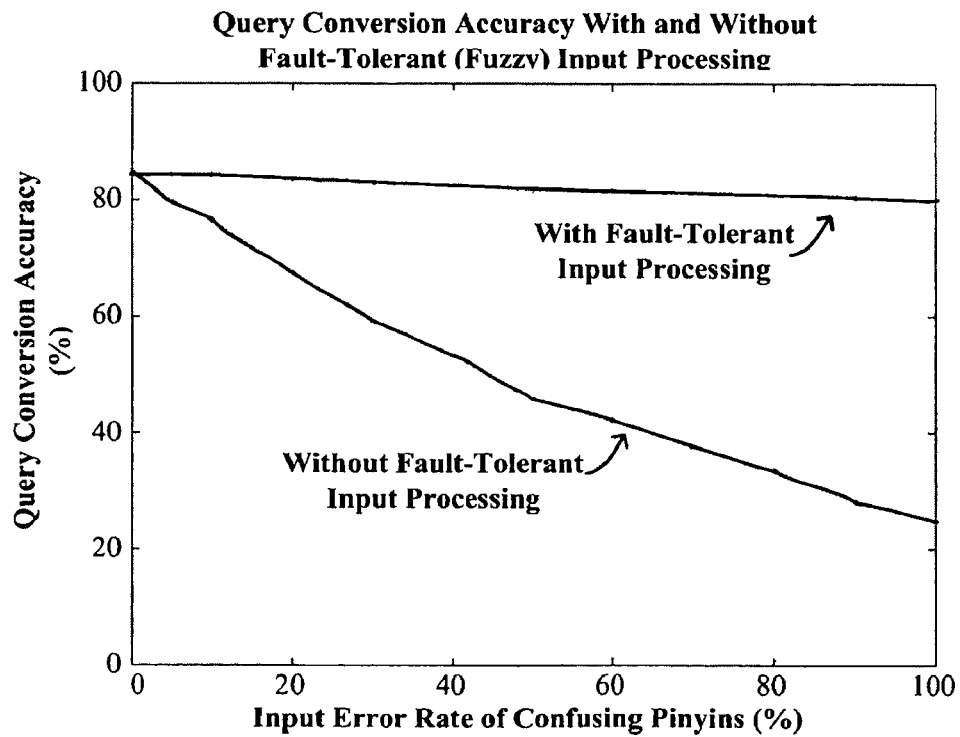
FIG. 9 is a graph illustrating query conversion accuracy rate relative to confusing pinyin input error rate with and without fault-tolerant input processing.

FIG. 9 is a graph illustrating query conversion accuracy rate relative to a confusing pinyin input error rate with (upper curve) and without (lower curve) fault-tolerant input processing. If one word or character in a given query is incorrectly converted, the entire query is considered as incorrect. For example, a query containing 4 characters of which 1 is non-confusing and 3 are confusing and one of the 3 confusing pinyin is incorrect would have a 33% confusing pinyin input error rate. As such, the conversion accuracy at the query level is lower than that at the character level as shown and described above with reference to FIG. 8. The confusing pinyin input error rate (x-axis) refers to the percentage of confusing pinyins in the query input that are incorrectly entered. As shown, the conversion accuracy with 0% confusing pinyin input error rate for a query can be as high as approximately 85%. However, if any of the pinyins in the query input is incorrect, i.e., confused with another similarly pronounced pinyin, the query conversion accuracy decreases. The lower curve illustrates a relatively significant decrease in query conversion accuracy without the use of the fault-tolerant (fuzzy) pinyin input processing as the confusing pinyin input error rate increases. For example, the query conversion accuracy decreases to approximately 25% at a 100% confusing pinyin input error rate. The upper curve illustrates a much lower decrease in query conversion accuracy with the use of fault-tolerant (fuzzy) pinyin input processing even as the confusing pinyin input error rate increases. For example, the query conversion accuracy decreases only slightly to approximately 80% even at 100% confusing pinyin input error rate.

Figure 10:
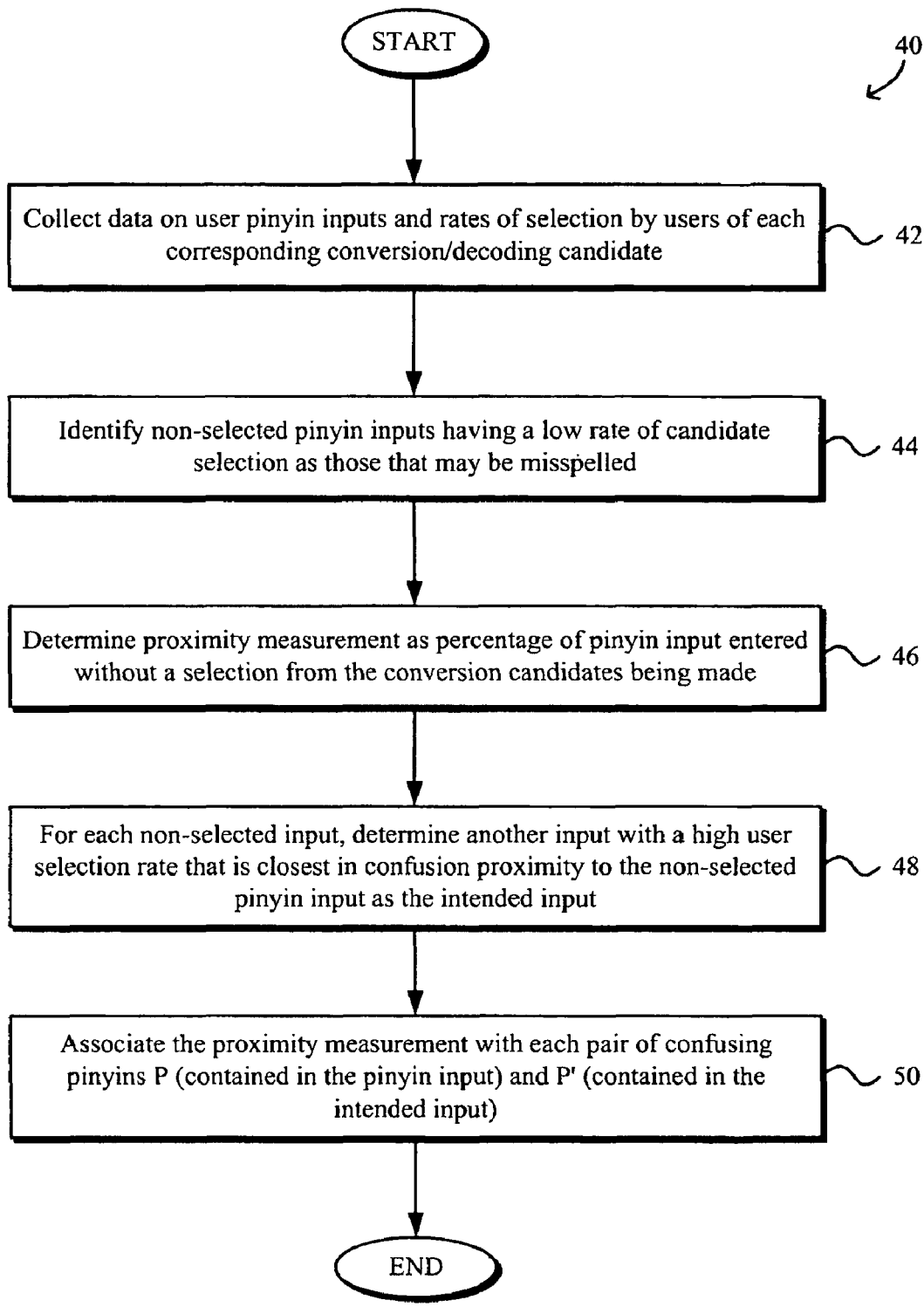
FIG. 10 is a flowchart illustrating a process for training a fault-tolerant input processor.

FIG. 10 is a flowchart illustrating a process 40 for training the fault-tolerant input system and method and more specifically, for generating the proximity matrix such as that shown in FIG. 2. In particular, the process of generating the proximity matrix may utilize data collected from user pinyin inputs and associated user selections in order to generate fuzzy pinyin probabilities. By using a set of inputs to train the proximity matrix, the likelihood of a spelling error in the pinyin input can be determined and processed to enhance the efficiency and effectiveness of the fault-tolerant input system.

The process for training the fault-tolerant input system and method and more specifically, for generating the proximity matrix may utilize data collected from user pinyin inputs and associated user selections in order to generate fuzzy pinyin probabilities. For example, in the context of a search engine, the user queries and the converted queries selected by the users are tracked and processed. For example, at block 42, data on user pinyin inputs and the rates of selection by users of each corresponding conversion/decoding candidate is collected. By using a set of actual user inputs to train the proximity matrix, the likelihood of a spelling error in the pinyin input can be determined and processed to enhance the efficiency and effectiveness of the fault-tolerant input system.

When a pinyin input containing at least one misspelled pinyin is entered, the user typically does not select any of the conventionally converted candidates, i.e., converted without fault tolerance, as generally none of the candidates would correspond to the user's intended input. In contrast, when the user correctly enters a pinyin input, one of the converted Chinese candidates is likely to be selected. Thus at block 44, the non-selected pinyin inputs that have low candidate selection rates are identified as those that may contain a misspelled pinyin P, i.e., a pinyin that is likely to be different from the intended pinyin P'. In addition, at block 46, the percentage or rate of pinyin input entered by users without a selection from the conversion candidates being made is determined as the proximity measurement (probability) $p(P'|P)$.

The process 40 also determines all possible correct (intended) pinyin inputs for the non-selected incorrect pinyin inputs. In particular, at block 48, for each non-selected pinyin input, the intended pinyin input is determined as the pinyin input with relatively high (or highest) user selection rates that are close in confusion proximity (i.e., close in editing distance as determined in terms of the pairs of confusing pinyin elements such as those shown in FIG. 1) to the corresponding non-selected pinyin input. In other words, the confusion proximity is determined based on the list of pairs of confusingly similar pinyin elements. Thus the misspelled pinyin P (contained in the original pinyin input) and the intended pinyin P' (contained in the intended pinyin input) differ from each other by one or more pairs of the confusingly similar pinyin elements.

At block 50, the proximity measurement is associated with each pair of confusing pinyins P and P'. For example, the non-selected pinyin input and the intended pinyin input may be compared to determine the incorrect pinyin P and the intended pinyin P'. The proximity measurement associated with the confusing pair of pinyins P and P' thus relates to the likelihood that the users entered pinyin input P and intended pinyin P', i.e., the frequency that an input pinyin P should be substituted by the pinyin P'. Specifically, the proximity measurement $p(P'|P)$ (as determine in block 46) of a given confusing pinyin pair P and P' is determined as $n(P \rightarrow P')/n(P)$ where $n(P)$ is the number of times that pinyin input P is entered by users and $n(P \rightarrow P')$ is the number of times that the pinyin input should be substituted by its corresponding fuzzy pinyin P', i.e., the number of times that the users did not make a selection from the list of candidate conversions.

As is evident, the order of the blocks illustrated for process 40 is merely illustrative and may be modified. Further, it is noted that the proximity matrix may remain constant once generated or may be modified periodically over time based on new user pinyin input and selection data. One alternative process for generating the proximity matrix, such as when there is an insufficient amount of data to generate meaningful probabilities, is to set the proximity (probability) between each pair of confusing pinyins to an estimated constant. For example, it may be assumed that the likelihood or probability that a user enters pinyin "shang" instead of the intended pinyin "shan" is 0.03. Note that for a given confusing input pinyin P, the sum of the likelihood or probability that the input pinyin is the intended pinyin, i.e., P'=P, and the likelihoods or probabilities that the input pinyin is a variant of the intended pinyin should total approximately 1.0.

It is noted that the illustrative fault-tolerant input systems and methods as described herein are particularly applicable in the context of a web search engine and to a search engine for a database containing organized data. However, it is to be understood that the fault-tolerant input systems and method may be adapted and employed for various other applications for spelling error detection and correction, particularly for entries in a non-Romanized language. For example, the system and method may be adapted for a CJK text input application, e.g., word processing application, that detects and corrects spelling errors.

The fault-tolerant input systems and method are particularly well suited for use with non-Roman based languages and can be highly effective in both detecting spelling errors and in inferring the correct Chinese characters from pinyin inputs with spelling errors. Such fault-tolerant input system and method allow Chinese users to input Chinese words using approximate pronunciations rather than requiring the use of precise pinyins. The method may also utilize context to reduce uncertainty and/or the perplexity.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A computer-implemented method for identifying most likely conversions of original inputs that include potentially incorrect original inputs, the method comprising:
   receiving an original sequence of original Pinyin inputs, each original Pinyin input having associated proximity measurements, each proximity measurement being indicative of a probability of a respective intended Pinyin input being entered as the original Pinyin input;
   identifying each original Pinyin input that has proximity measurements indicating one or more non-zero probabilities for respective intended Pinyin inputs that are different from the original Pinyin input as a potentially incorrect original Pinyin input;
   generating alternative sequences of Pinyin inputs from the original sequence of original Pinyin inputs, each alternative sequence of Pinyin inputs including at least one intended Pinyin input that is different from a potentially incorrect original Pinyin input in place of the potentially incorrect original Pinyin input;
   determining a corresponding conversion to Hanzi characters for the original sequence of original Pinyin inputs and for each alternative sequence of Pinyin inputs;
   associating with each conversion a likelihood, each likelihood being based on the proximity measurements associated with the intended Pinyin inputs included in the corresponding sequences of Pinyin inputs;
   identifying most likely conversions for presentation, the most likely conversions including:
      a first conversion to first Hanzi characters converted from the original sequence of original Pinyin inputs, the first conversion having a first likelihood; and
      a second conversion to second Hanzi characters converted from one of the alternative sequences of Pinyin inputs and having a second likelihood that exceeds the first likelihood by a predetermined threshold.

2. The method of claim 1, wherein the proximity measurements are context independent.

3. The method of claim 1, wherein the proximity measurements correspond to pairs of vowels and consonants.

4. The method of claim 3, wherein the pairs of vowels and consonants comprise one or more of the pairs in/ing, an/ang, en/eng, l/n, sh/s, ch/c, zh/z, and h/f.

5. The method of claim 1, wherein each likelihood is further based in part on contextual probabilities associated with the Hanzi characters for each of the conversions.

6. A computer program product for use in conjunction with a computer system, the computer program product comprising a computer readable storage medium on which are stored instructions executable on a computer processor, and which upon such execution cause the computer processor to perform the operations of:
   receiving an original sequence of original Pinyin inputs, each original Pinyin input having associated proximity measurements, each proximity measurement being indicative of a probability of a respective intended Pinyin input being entered as the original Pinyin input;
   identifying each original Pinyin input that has proximity measurements indicating one or more non-zero probabilities for respective intended Pinyin inputs that are different from the original Pinyin input as a potentially incorrect original Pinyin input;
   generating alternative sequences of Pinyin inputs from the original sequence of original Pinyin inputs, each alternative sequence of Pinyin inputs including at least one intended Pinyin input that is different from a potentially incorrect original Pinyin input in place of the potentially incorrect original Pinyin input;
   determining a corresponding conversion to Hanzi characters for the original sequence of original Pinyin inputs and for each alternative sequence of Pinyin inputs;
   associating with each conversion a likelihood, each likelihood being based on the proximity measurements associated with the intended Pinyin inputs included in the corresponding sequences of Pinyin inputs;
   identifying most likely conversions for presentation;
   identifying each most likely conversion that is a conversion of an alternative sequence of Pinyin inputs for presentation in a first presentation style; and
   identifying each most likely conversion that is a conversion of the original sequence of original Pinyin inputs for presentation in a second presentation style, the second presentation style being different form the first presentation style.

7. The computer program product of claim 6, wherein the proximity measurements are context independent.

8. The computer program product of claim 7, wherein the proximity measurements correspond to pairs of vowels and consonants.

9. The computer program product of claim 6, wherein each likelihood is based in part on contextual probabilities associated with the Hanzi characters for each of the conversions.

10. The computer program product of claim 6, wherein the computer program product includes further instructions executable on the computer processor, and which upon such execution cause the computer processor to perform the operations of:

identifying as a mostly likely conversion first conversion to first Hanzi characters converted from the original sequence of original Pinyin inputs, the first conversion having a first likelihood; and identifying as a mostly likely conversion a second conversion to second Hanzi characters converted from one of the alternative sequences of Pinyin inputs and having a second likelihood that exceeds the first likelihood by a predetermined threshold.

* * * * *